US010519888B2

(12) United States Patent
Huang et al.

(10) Patent No.: US 10,519,888 B2
(45) Date of Patent: Dec. 31, 2019

(54) FUEL SYSTEM DIAGNOSTICS

(71) Applicant: WESTPORT POWER INC., Vancouver (CA)

(72) Inventors: Jian Huang, Richmond (CA); Sandeep Munshi, Delta (CA)

(73) Assignee: WESTPORT POWER INC., Vancouver, BC (CA)

(*) Notice: Subject to any disclaimer, the term of this patent is extended or adjusted under 35 U.S.C. 154(b) by 24 days.

(21) Appl. No.: 14/775,536

(22) PCT Filed: Mar. 11, 2014

(86) PCT No.: PCT/CA2014/050212
§ 371 (c)(1),
(2) Date: Sep. 11, 2015

(87) PCT Pub. No.: WO2014/138970
PCT Pub. Date: Sep. 18, 2014

(65) Prior Publication Data
US 2016/0032853 A1 Feb. 4, 2016

(30) Foreign Application Priority Data
Mar. 12, 2013 (CA) .................................... 2809291

(51) Int. Cl.
*F02D 41/22* (2006.01)
*F02D 41/14* (2006.01)
(Continued)

(52) U.S. Cl.
CPC ............. *F02D 41/22* (2013.01); *F02D 19/06* (2013.01); *F02D 29/02* (2013.01); *F02D 35/024* (2013.01);
(Continued)

(58) Field of Classification Search
CPC .......... F02D 41/0025–0077; F02D 41/06–068; F02D 41/221; F02D 19/00–12;
(Continued)

(56) References Cited

U.S. PATENT DOCUMENTS 7,093,426 B2 * 8/2006 Ichihara .................... F02D 9/02
60/274
7,133,761 B2 * 11/2006 Ancimer ............... F02D 35/028
123/435

(Continued)

FOREIGN PATENT DOCUMENTS

CN 101765707 A 6/2010
EP 1 429 009 A1 6/2004
(Continued)

OTHER PUBLICATIONS

Supplementary Partial European Search Report, dated Nov. 8, 2016, for European Application No. 14 76 4981, 5 pages.
(Continued)

*Primary Examiner* — Lindsay M Low
*Assistant Examiner* — Robert A Werner
(74) *Attorney, Agent, or Firm* — Seed IP Law Group LLP

(57) ABSTRACT

A method and apparatus for in situ operating an internal combustion engine comprising determining at least one combustion characteristic for a combustion chamber of the internal combustion engine, comprising an actual heat release signal for the combustion chamber; and inputting the actual heat release signal into a diagnostic logic tree for diagnosing changes in combustion characteristics due to at least one of: a malfunctioning fuel injector, a start of combustion timing error; and a change in fuel quality; and performing a mitigation technique to compensate for the changes in combustion characteristics.

20 Claims, 6 Drawing Sheets

(51) Int. Cl.
*F02D 19/06* (2006.01)
*F02D 29/02* (2006.01)
*F02D 35/02* (2006.01)
*F02D 41/00* (2006.01)

(52) U.S. Cl.
CPC .......... *F02D 35/027* (2013.01); *F02D 41/14* (2013.01); *F02D 41/1438* (2013.01); *F02D 41/221* (2013.01); F02D 19/0647 (2013.01); F02D 35/028 (2013.01); F02D 41/008 (2013.01); F02D 2041/224 (2013.01); F02D 2200/0612 (2013.01); F02D 2200/0616 (2013.01); F02D 2200/0618 (2013.01); Y02T 10/36 (2013.01); Y02T 10/40 (2013.01)

(58) Field of Classification Search
CPC ............... F02D 35/024; F02D 35/027; F02D 2200/0406; F02D 2200/0408; F02D 41/22; F02D 41/222; F02D 41/1438; F02D 2041/224; F02D 2041/225; F02D 2200/0616
USPC ........ 123/304, 525–527, 575–576, 435, 479, 123/198 D, 673, 676; 701/101–104, 113, 701/107; 73/114.38, 114.45
See application file for complete search history.

(56) References Cited

U.S. PATENT DOCUMENTS

| | | | |
|---|---|---|---|
| 7,277,790 B1 | 10/2007 | Green, Jr. et al. | |
| 7,444,231 B2 | 10/2008 | Ancimer et al. | |
| 7,669,583 B2 * | 3/2010 | Moriya | F02D 35/023 123/406.22 |
| 8,051,836 B2 * | 11/2011 | Moriya | F02D 35/023 123/435 |
| 8,108,131 B2 * | 1/2012 | Huang | G01M 15/11 123/406.27 |
| 8,340,887 B2 * | 12/2012 | Yamaguchi | F02D 35/023 123/299 |
| 8,412,438 B2 * | 4/2013 | Carter | F02D 41/0027 123/527 |
| 8,439,016 B2 * | 5/2013 | Carter | F02D 41/0027 123/456 |
| 8,473,180 B2 * | 6/2013 | Wang | F02D 19/08 123/299 |
| 2005/0051139 A1 | 3/2005 | Slater et al. | |
| 2007/0186903 A1 | 8/2007 | Zhu et al. | |
| 2008/0243358 A1 * | 10/2008 | Kojima | F02D 35/025 701/102 |
| 2008/0262699 A1 * | 10/2008 | Hasegawa | F02D 35/023 701/103 |
| 2009/0055083 A1 * | 2/2009 | Sasaki | F02D 35/024 701/104 |
| 2009/0292447 A1 * | 11/2009 | Yamaguchi | F02D 35/023 701/103 |
| 2010/0126481 A1 | 5/2010 | Willi et al. | |
| 2011/0173957 A1 * | 7/2011 | Funk | F01N 3/2033 60/285 |
| 2012/0031384 A1 * | 2/2012 | Haskara | F02D 35/023 123/703 |
| 2012/0145096 A1 | 6/2012 | Shimada et al. | |
| 2012/0150414 A1 * | 6/2012 | Huang | F02D 35/024 701/101 |
| 2012/0324989 A1 * | 12/2012 | Patel | G01M 15/08 73/114.16 |
| 2015/0000631 A1 * | 1/2015 | Choi | F02D 41/402 123/305 |

FOREIGN PATENT DOCUMENTS

| | | |
|---|---|---|
| EP | 1 900 926 A1 | 3/2008 |
| EP | 2 123 887 A1 | 11/2009 |
| EP | 2 541 030 A1 | 1/2013 |
| JP | 2003083116 A * | 3/2003 |
| JP | 5146581 B1 | 2/2013 |

OTHER PUBLICATIONS

International Search Report dated Jun. 10, 2014, for corresponding International Application No. PCT/CA2014/050212, 7 pages.
Chinese Office Action, dated Jul. 29, 2017, for Chinese Application No. 201480014259.X, 14 pages (with English translation).
Chinese Search Report, dated Jul. 29, 2017, for Chinese Application No. 201480014259.X, 4 pages (with English Translation).
Chinese Office Action, dated Jul. 27, 2017, for Chinese Application No. 201480014259.X, 14 pages (with English translation).
Chinese Search Report, dated Jul. 27, 2017, for Chinese Application No. 201480014259.X, 4 pages (with English Translation).

* cited by examiner

FUEL SYSTEM DIAGNOSTICS

FIELD OF THE INVENTION

The present application relates to a technique of employing a non-intrusive combustion sensor for fuel system diagnostics in an internal combustion engine.

BACKGROUND OF THE INVENTION

Closed-loop engine control is increasingly being adopted by major engine manufacturers in next-generation engine designs to improve reliability, performance and emissions. A key component of closed-loop engine control is a combustion sensor. The main function of the combustion sensor is to obtain detailed information regarding the quality of in-cylinder combustion including heat release timing (e.g. 10%, 50% and 90%), total amount of apparent heat release from an individual cylinder and in-cylinder pressure. The information can be used in real-time engine control for balancing cylinder load and compensating for fuel system variability.

The most reliable way to obtain in-cylinder combustion information is by measuring in-cylinder pressure directly. There are several techniques for which to measure in-cylinder pressure. However, the cost and durability of existing in-cylinder pressure (combustion) sensors is far from what can be accepted by engine manufacturers. The extra machining required to access the combustion chamber also increases the difficulty of implementing the technology.

Changes in combustion characteristics (heat release) can be due to a number of factors other than change in fuel quantity. For example, a faulty or failed fuel injector can influence combustion by introducing too much or too little fuel into the combustion chamber or introducing fuel at a timing other than what is expected. Changes in fuel quality (heating value) also contribute to combustion characteristic changes. In certain locations around the world, such as in Europe, it is common for fuel quality for gaseous fuels to vary from region to region due to disparate regulating bodies. Existing control techniques employing combustion sensors do not detect these other factors causing changes in combustion characteristics which can impact closed-loop control since the control may not be correcting for the corresponding cause.

The state of the art is lacking in techniques for determining what factors are causing changes in combustion characteristics. The present method and apparatus provide a technique for employing a non-intrusive combustion sensor for fuel system diagnostics in an internal combustion engine.

SUMMARY OF THE INVENTION

An improved method of for in situ operating an internal combustion engine comprises determining at least one combustion characteristic for a combustion chamber of the engine. The at least one combustion characteristic comprises an actual heat release signal for the combustion chamber. The actual heat release signal is inputted into a diagnostic logic tree for diagnosing changes in combustion characteristics due to at least one of: (a) a malfunctioning fuel injector associated with the combustion chamber; (b) a start of combustion timing error; and, (c) a change in fuel quality. A mitigation technique is performed to compensate for the changes in combustion characteristics.

The method preferably further comprises determining a desired heat release signal as a function of engine operating conditions. A difference between the actual heat release signal and the desired heat release signal is compared with a predetermined tolerance. When such difference is outside a range of the predetermined tolerance the fuel injector is diagnosed to be malfunctioning. That is, when such difference is greater than a positive value of the predetermined tolerance, the malfunctioning fuel injector is introducing too much fuel, and when such difference is less than a negative value of the predetermined tolerance, then it is introducing too little fuel.

The method further comprises determining another combustion characteristic for the combustion chamber, comprising an actual start of combustion timing, which the method inputs into the diagnostic logic tree for diagnosing the start of combustion timing error. A desired start of combustion timing is determined as a function of engine operating conditions. A difference between the actual start of combustion timing and the desired start of combustion timing is compared with a first predetermined tolerance; and when the difference is outside a range of the first predetermined tolerance the start of combustion timing error is corrected by adjusting start of injection timing for the fuel injector. As a precondition before adjusting the start of injection timing for the fuel injector, it is determined that the fuel injector is introducing an amount of fuel within a range of a second predetermined tolerance.

The method further comprises determining a fuelling correction as a function of at least one of an actual intake manifold pressure and the actual heat release signal. The fuelling correction corrects for changes in the combustion characteristic caused by changes in fuel quality. In one embodiment the following steps are employed to determine the fuelling correction. A desired intake manifold pressure is determined as a function of engine operating conditions. A first difference between the actual intake manifold pressure with the desired intake manifold pressure is compared with a first predetermined tolerance. When the first difference is outside a range of the first predetermined tolerance, the fuelling correction is determined as a function of the first difference. When the internal combustion engine comprises a plurality of combustion chambers associated with respective fuel injectors, each of the combustion chambers comprises a respective combustion characteristic and the internal combustion engine comprises an engine combustion characteristic. A mean heat release signal for the engine is determined as a function of heat release signals associated with respective combustion chambers. A desired mean heat release signal is determined as a function of engine operating conditions. A second difference between the actual mean heat release signal with the desired mean heat release signal is compared with a second predetermined tolerance. When the second difference is outside a range of the second predetermined tolerance, the fuelling correction is determined. As a precondition to determining the fuelling correction, it is determined that each fuel injector in the internal combustion engine is introducing an amount of fuel into respective combustion chambers within a range defined by a second predetermined tolerance.

In another embodiment the following steps are employed to determine the fuelling correction. When the internal combustion engine comprises a plurality of combustion chambers associated with respective fuel injectors, each of the combustion chambers comprises a respective combustion characteristic and the internal combustion engine comprises an engine combustion characteristic. A mean heat release signal for the internal combustion engine is determined as a function of heat release signals associated with respective combustion chambers, and a desired mean heat release signal is determined as a function of engine operating conditions. A first difference between the actual mean heat release signal with the desired mean heat release signal is compared with a first predetermined tolerance. The fuelling correction is then determined as a function of the first difference when the first difference is outside a range defined by the first predetermined tolerance. A desired intake manifold pressure can be determined as a function of engine operating conditions, and a second difference between the actual intake manifold pressure with the desired intake manifold pressure can be compared with a second predetermined tolerance, such that the fuelling correction is performed when the second difference is outside a range defined by the second predetermined tolerance.

In yet another embodiment, the fuelling correction can be determined as a function of at least one of an actual exhaust manifold pressure and the actual heat release signal.

The internal combustion engine can be fuelled with boil-off gas during start-up. When fuelled with boil-off gas, the change in fuel quality with respect to a default fuel quality is detected. A fuelling correction is provided to correct for the change in fuel quality. The engine is switched to fuelling with a cryogenic fuel after determining the occurrence of one of: a predetermined amount of time fuelling the internal combustion engine with the boil-off gas has elapsed; and, vapor pressure for the boil-off gas has dropped below a predetermined value. The change in fuel quality with respect to the default fuel quality can be detected when fuelling with the cryogenic fuel. Another fuelling correction is then provided to correct for the change in fuel quality.

The internal combustion engine can be fuelled with one of a cryogenic fuel, a boil-off gas of the cryogenic fuel, and a combination of the cryogenic fuel and the boil-off gas of varying proportions. The change in fuel quality can be detected with respect to a default fuel quality. A fuelling correction can be provided to correct for the change in fuel quality. The engine can be selectively fuelled with the cryogenic fuel, the boil-off gas, and the combination of the cryogenic fuel and the boil-off gas.

An improved apparatus for in situ operating an internal combustion engine comprises an accelerometer sensor associated with a combustion chamber in the internal combustion engine and a controller receiving a signal from the accelerometer sensor representative of pressure in the combustion chamber. The controller is programmed to determine at least one combustion characteristic for the combustion chamber comprising an actual heat release signal; and input the actual heat release signal in a diagnostic logic tree for diagnosing changes in combustion characteristics due to at least one of (a) a fuel injector associated with the combustion chamber is malfunctioning, (b) a start of injection timing error and (c) a change in fuel quality. A mitigation technique is performed to compensate for the changes in combustion characteristics.

DETAILED DESCRIPTION OF PREFERRED EMBODIMENT(S)

Figure 1:
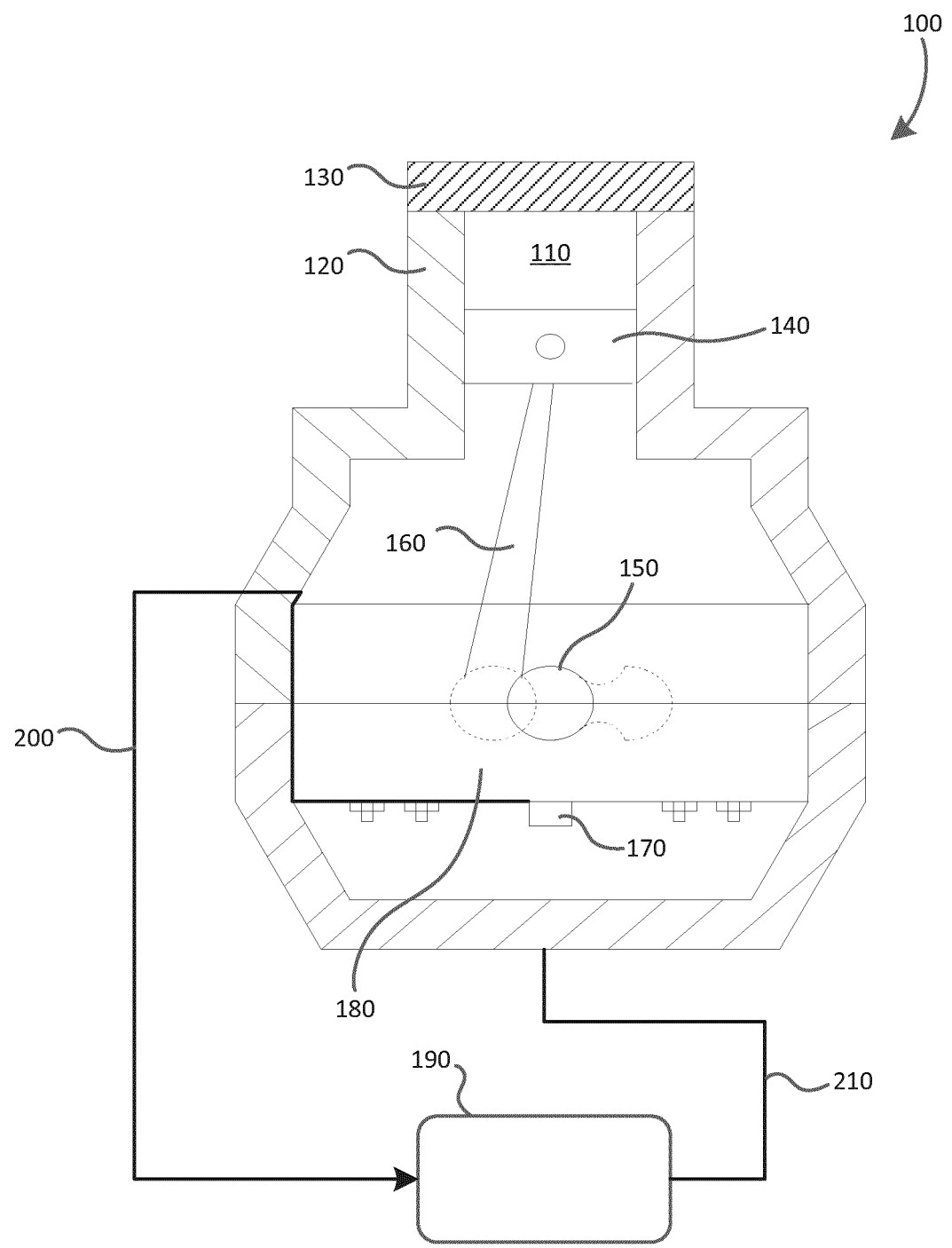
FIG. 1 is a schematic view of a cylinder of an internal combustion engine equipped with an accelerometer sensor and a control system for fuel system diagnostics employing a signal received from the accelerometer sensor.

Referring to FIG. 1, there is shown by way of example an internal combustion engine 100 with a control system employed to detect factors causing changes in combustion characteristics by reasons other than changes in fuel quantity and to perform a mitigation technique to compensate for the changes. The control system operates in situ in real-time, such that engine 100 can run continuously while the control system operates without having to be stopped. Engine 100 comprises combustion chamber 110, which in this example is defined by cylinder 120, cylinder head 130 and piston 140. Only one such cylinder is shown in FIG. 1 although as would be known by those skilled in the technology engine 100 normally comprises two or more cylinders, and the technique disclosed herein applies to any engine having one or more cylinders. Piston 140 is reciprocal within cylinder 120, and the reciprocating motion of piston 140 is translated into rotation of crankshaft 150 via connecting rod 160 which is operatively attached at opposite ends to piston 140 and crankshaft 150. Intake and exhaust valves (not shown) operate to deliver charge comprising oxygen from an intake manifold to combustion chamber 110, and to remove exhaust by-products therefrom to an exhaust manifold. Engine 100 further comprises fuel and air delivery systems, and other standard systems associated with internal combustion engines.

Engine 100 shows accelerometer sensor 170 in the form of a knock sensor mounted on bearing cap 180, which acts as a damped oscillator by damping deflections caused by changes in the in-cylinder pressure. Many conventional engine knock sensors employ accelerometers and would be suitable for the disclosed arrangement. Accelerometer 170 is employed to detect changes in pressure in combustion chamber 110 by way of vibrational signals generated during combustion. As would be known by those skilled in the technology other locations in engine 100 can be employed to mount accelerometer 170 such that changes in combustion pressure can be detected. Electronic controller 190 receives a signal representative of in-cylinder pressure from accelerometer 170 over signal wire 200. When engine 100 comprises a plurality of cylinders the number of accelerometers required depends upon the engine geometry. In a typical engine because adjacent cylinders are normally operated out of phase with respect to each other one such accelerometer 170 and corresponding signal wire 200 can be associated with an adjacent pair of combustion chambers. As is known to those familiar with the technology, electronic controller 190 receives other signals from other sensors in engine 100, such as engine speed (RPM), pedal position, intake manifold pressure (IMP), throttle position sensor, lambda sensor, fuel rail pressure and torque, and the collection of these signals and their input to the controller is represented by signal wires 210. Electronic controller 190 comprises modules that are responsive to signals over wires 200 and 210 to perform fuel system diagnostics to determine which factors are causing changes in combustion characteristics. As used herein, the terms module, algorithm and step refer to an application specific integrated circuit (ASIC), an electronic circuit, a processor (shared, dedicated, or group) and memory that execute one or more software or firmware programs, a combinational logic circuit, and/or other suitable components that provide the described functionality. In preferred embodiments the modules, algorithms and steps herein are part of electronic controller 190.

Figure 2:
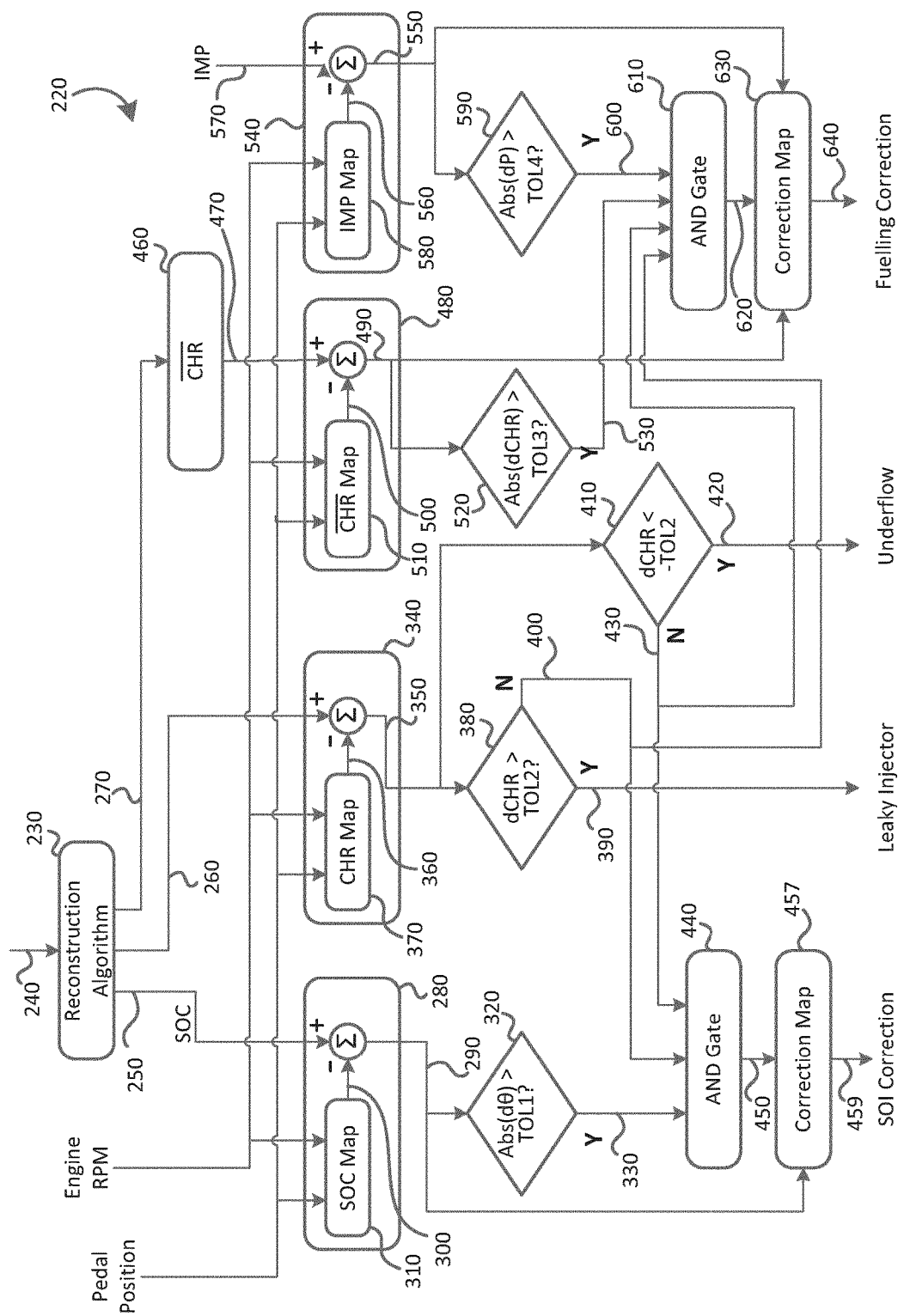
FIG. 2 is a flow chart of a diagnostic logic tree module in the control system for the fuel system diagnostics of FIG. 1.

Combustion characteristics such as heat release and start of combustion timing change when the quantity of fuel introduced to the combustion chamber is changed as a result of engine operating conditions. However, combustion characteristics can change for reasons other than commanded changes in fuel quantity. For example if a fuel injector is damaged it can unexpectedly modify the amount of fuel introduced to the combustion chamber. Combustion characteristics can also change when the fuel quality changes, which can occur for a variety of reasons. If fuel quality changes, then even though the quantity of fuel introduced to the combustion chamber is constant combustion characteristics can change. For example, fuel quality can change when adding a fuel to the fuel tank that has a different heating value than the fuel already in the tank, and also when the fuel ages or when a portion of the fuel evaporates. To identify causes and consequences for possible failure in the combustion system, a simplified failure mode engineering analysis (FMEA) (see Table 1) was performed with a focus on the facts that have direct impact on in-cylinder combustion. A diagnostic logic tree was developed based on the failure modes and detection and mitigation strategies were formed. These strategies were implemented in engine controller 190 and tested as will be explained after discussing the diagnostic logic tree. Within Table 1, trimming of a fuel injector is listed as a recommended action in certain failure modes. Trimming refers to modifying the injection timing and/or pulse width for an individual fuel injector in the present disclosure. FIG. 2 shows the diagnostic logic tree corresponding to each of the failure modes listed in Table 1.

TABLE 1

| Function | Failure Mode | Effects | Cause(s) | Recommended Actions |
| --- | --- | --- | --- | --- |
| Fuel Injection | (1) Injector failed to open (underflowing). | Misfire for individual cylinder | Solenoid failure, stuck needle | Inspect injector and take corrective action. |
| Fuel Injection | (2) Injector failed to close (leaky). | Abnormal heat release in one or more cylinders, engine damage | Broken/stuck needle, broken seat, spring failure | Inspect injector and take corrective action. |
| Fuel Injection | (3) Shift in injection timing | Change in emission/engine stability/load distribution | Degraded needle motion (sticky needle), faulty solenoid | Trim if possible otherwise inspect injector and take corrective action. |
| Fuel Injection | (4) Change in flow rate | Change in emission/reduced torque/load distribution | Degraded needle motion (sticky needle), faulty solenoid, build-up in injector | Trim if possible otherwise inspect injector and take corrective action. |
| Fuel Composition | (5) Change in fuel composition | Over/under torque; emission failure | Fuel supply change/change in fuel quality | Change fuelling map. |

Referring to FIG. 2, module 220 is a virtual combustion sensor in the form of a diagnostic logic tree that detects changes in combustion characteristics and considers a plurality of factors that can cause such changes and diagnoses which specific factor(s) caused such changes by reasons other than commanded changes in fuel quantity. Module 220 can perform mitigation techniques to compensate for the changes in the combustion characteristics when possible.

Reconstruction algorithm 230 receives accelerometer signal(s) 240 from each of the accelerometers 170 over signal wires 200 associated with respective combustion chambers 110, and determines start of combustion (SOC) timing 250 and heat release in the form of cumulative heat release 260 for each combustion chamber 110. Cumulative heat release 270 is based on actual cumulative heat release signals 260 for all combustion chambers, received by module 460 for determining mean cumulative heat release 470 for engine 100. Reconstruction algorithm 230 can be that disclosed in the Applicant's corresponding United States Patent Publication No. 20120150414, but any reconstruction algorithm that provides SOC timing and heat release information for a combustion chamber can be employed. In a preferred embodiment reconstruction algorithm 230 comprises adaptive learning capabilities in the form of a corrective algorithm that adjusts algorithm 230 to variations in performance as engine 100 ages. The corrective algorithm is part of on-board diagnostics (OBD), and as algorithm 230 is adjusted other OBD diagnostics that employ algorithm 230 are adjusted accordingly.

Module 280 determines SOC timing error 290 which is the difference between actual SOC timing 250 and desired SOC timing 300. Engine parameters comprising engine speed and pedal position are employed to look up desired SOC timing 300 in map 310. As would be known by one skilled in the technology other combinations of engine parameters can be employed to look up desired SOC timing in map 310, as well as looking up other characteristics in other maps 370, 510, 580. As an example a non-exhaustive list of such engine parameters comprises engine speed, pedal position, fuelling quantity, torque and fuel rail pressure, in addition to other engine parameters. Error 290 is compared against a predetermined range defined by tolerance [−TOL1, TOL1] in module 320, and when error 290 is outside the predetermined range defined by the predetermined tolerance (the absolute value of error 290 is greater than tolerance TOL1) signal 330 is set to logic one, else signal 330 is set to logic zero. Signal 330 is employed in module 440 for determining a start of injection timing correction as will be explained in more detail below.

Module 340 determines cumulative heat release error 350, for one combustion chamber 110, which is the difference between actual cumulative heat release 260 and desired cumulative heat release 360. Engine parameters comprising engine speed and pedal position are employed to look up desired cumulative heat release 360 in map 370, and as previously discussed other engine parameters can be employed as the defining parameters in the look up process. Error 350 is compared against a predetermined tolerance TOL2 in module 380, and when the error is greater than the tolerance, signal 390 is set to logic one and signal 400 is set to logic zero, else when the error is not greater than tolerance TOL2, signal 390 is set to logic zero and signal 400 is set to logic one. When signal 390 is set to a logic one (actual cumulative heat release 260 is greater than desired cumulative heat release 360 by more than tolerance TOL2) it indicates that the fuel injector associated with that combustion chamber is introducing more fuel into the combustion chamber than desired. That is, an over-flowing or leaky fuel injector is causing changes in the combustion characteristics for that combustion chamber. Signal 390 is connected with the OBD system such that other engine systems as well as the vehicle operator or maintenance personnel can be made aware of the over-flowing or leaky fuel injector.

Error 350 is compared against a negative of tolerance TOL2 in module 410, and when the error is less than the negative of tolerance TOL2, signal 420 is set to logic one and signal 430 is set to logic zero, else when the error is not less than the negative of tolerance TOL2, signal 420 is set to logic zero and signal 430 is set to logic one. When signal 420 is set to a logic one (actual cumulative heat release 260 is less than desired cumulative heat release 360 by at least tolerance TOL2) it indicates that the fuel injector associated with that combustion chamber is introducing less than the desired amount of fuel into the combustion chamber. That is, an under-flowing fuel injector is causing changes in the combustion characteristics for that combustion chamber. Signal 420 is connected with the OBD system such that other engine systems as well as the vehicle operator or maintenance personnel can be made aware of the under-flowing fuel injector.

Module 440 determines whether an incorrect SOC timing is the factor causing changes in the combustion characteristic for an individual combustion chamber. Module 440 receives as inputs signal 330 from module 320 and signals 400 and 430 from modules 380 and 410 respectively and operates as a logic AND function. Signal 330 when set to logic one indicates that SOC timing error 290 for a combustion chamber is outside the range defined by tolerance [−TOL1, TOL1]. Signals 400 and 430 when set to logic one indicate that the fuel injector associated with that combustion chamber is neither over-flowing nor under-flowing, and are employed by module 440 to rule out a faulty injector causing start of combustion timing errors. When each of the signals 330, 400 and 430 are set to logic one, module 440 sets signal 450 to logic one indicating SOC timing is causing changes in combustion characteristics and a start of injection (SOI) timing correction is required. Module 457 determines SOI timing correction 459 as a function of SOC timing error 290 when signal 450 is set to logic one. SOI timing correction 459 adjusts the timing of when fuel is injected by the fuel injector associated with the combustion chamber experiencing the SOC timing error to reduce the error to within the predetermined range of tolerance.

Module 480 determines mean cumulative heat release error 490 for all combustion chambers 110 of engine 100, which is the difference between actual mean cumulative heat release 470 and desired mean cumulative heat release 500. Engine parameters comprising engine speed and pedal position are employed to look up desired mean cumulative heat release 500 in map 510, and as previously discussed other engine parameters can be employed as the defining parameters in the look up process. Error 490 is compared against a predetermined range of tolerance [−TOL3, TOL3] in module 520, and when error 490 is outside the predetermined range of tolerance (the absolute value of error 490 is greater than tolerance TOL3) signal 530 is set to logic one, else it is set to logic zero. Signal 530 is employed in an algorithm for detecting changes in fuel quality, which is described below.

In the embodiment of the diagnostic logic tree shown in FIG. 2, engine 100 comprises a turbo charger (not shown in FIG. 1) that increases intake manifold pressure (IMP) as a function of exhaust pressure and other engine operating parameters. Fuel quality changes can affect combustion characteristics and exhaust pressure due to changes in the heating value of the fuel. By monitoring IMP a determination can be made as to whether fuel quality has changed. In other embodiments when engine 100 is not turbo charged then exhaust pressure can be monitored as an alternative to monitoring intake manifold pressure. Module 540 determines IMP error 550, which is the difference between actual IMP 570 and desired IMP 560. Engine parameters comprising engine speed and pedal position are employed to look up desired IMP 560 in map 580, and as previously discussed other engine parameters can be employed as the defining parameters in the look up process. IMP error 550 is compared against a predetermined range of tolerance [−TOL4, TOL4] in module 590, and when error 550 is outside the predetermined range of tolerance (the absolute value of error 550 is greater than tolerance TOL4) signal 600 is set to logic one, else it is set to logic zero.

Module 610 determines whether fuel quality is responsible for changes in combustion characteristics for engine 100 as a whole by evaluating signals 400 and 430 for each of the combustion chambers, and signals 530 and 600. Note that each combustion chamber has an associated pair of signals 400 and 430. For example, when engine 100 comprises two combustion chambers, there are two such signals 400 and two such signals 430, and when engine 100 comprises six combustion chambers, there are respectively six such signals each. Module 610 functions as a logic AND gate such that when all of the signals 400, 430, 530 and 600 are set to logic one then module 610 sets signal 620 to logic one indicating that fuel quality changes are responsible for combustion characteristic changes. By monitoring signals 400 and 430 in module 610 faulty injectors (over-fuelling and under-fuelling) can be ruled out as being responsible for changes in combustion characteristics. Both signals 530 and 600 indicate that fuel quality changes are responsible for combustion characteristic changes as will be explained in more detail below. Module 630 determines fuelling correction 640 as a function of at least one of IMP error 550 and mean cumulative heat release error 490 when signal 620 is set to logic one. Fuelling correction 640 comprises corrections to start of injection timing and to fuelling quantity required to bring mean cumulative heat release error 490 and IMP error 550 to within their respective predetermined ranges of tolerance.

Signals 530 and 600 independently indicate that changes in fuel quality are responsible for changes in combustion characteristics. Depending upon implementation details of engine 100 either one of these signals can be more sensitive than the other to changes in fuel quality and therefore more accurately detect these changes. In a preferred embodiment both signals 530 and 600 are employed in module 610 to complement each other for increased robustness in the fuel quality change detection algorithm. In other embodiments either signal 530 or 600 can be solely input into module 610 for detecting changes in fuel quality. In a preferred embodiment signal 530 provides a more accurate determination than signal 600 due to the relative values of tolerances TOL3 and TOL4 as seen in FIG. 2. The accuracy of signal(s) 240 from accelerometer(s) 170 determines the relative value of tolerances TOL1, TOL2 and TOL3, and this accuracy is dependent upon the type of accelerometer employed, the accelerometer mounting technique and upon the geometry of engine 100. Fuelling correction 640 is determined as a function of mean cumulative heat release error 490 when signal 530 has greater sensitivity in detecting fuel quality changes than signal 600, and when signal 600 has greater sensitivity than fuelling correction 640 is determined as a function of IMP error 550. In yet other embodiments, fuelling correction 640 can be employed as a function of both IMP error 550 and mean cumulative heat release error 490.

During transient engine operating conditions for engine 100 only signals 400, 430 and 530 are employed in module 610 to detect fuel quality changes. These signals are derived from accelerometer signals 240 which can detect changes in combustion characteristics on a cycle to cycle basis. Signal 600 although accurate for detecting changes in fuel quality during steady state operating conditions experiences reduced accuracy during transient conditions due to turbo charger lag. That is, fuel quality changes that cause either an increase or decrease in in-cylinder pressure and consequently the exhaust pressure do not cause an immediate increase or decrease in intake manifold pressure, which is employed to determine signal 600, due to turbo charger lag. During transient conditions module 630 determines fuelling correction 640 as a function of mean cumulative heat release error 490. During steady state operating conditions module 630 can determine fuelling correction 640 as a function of either or both mean cumulative heat release error 490 and IMP error 550.

The virtual combustion sensor system described herein comprises an accelerometer and intake manifold pressure sensor to monitor combustion characteristics including heat release magnitude and phasing. By monitoring the global (per engine) and local (per cylinder) changes in the combustion system, the sensor can differentiate changes in the combustion quality caused by fuel quality variation from those caused by fuel-system hardware issues. In the case of the former, the change can be quantified and engine fuelling control can be compensated accordingly; in the case of latter, an early warning can be raised so that the issue can be addressed as soon as it is recognized. SOI timing and fuelling quantity corrections determined by module 220 are input to other closed loop systems of engine 100 such that air fuel ratio and emissions are maintained within predetermined tolerance ranges and levels. Hardware problems with fuel injectors (over-flowing and under-flowing) are reported in OBD systems such that the vehicle operator or maintenance personnel can be notified that correction is required.

Module 220 can communicate with an aftertreatment hardware controller of engine 100, such as controller 190 in FIG. 1. Aftertreatment hardware comprises components such as Urea-selective catalytic reduction (SCR) converters and diesel particulate filters (DPF) and other associated sensors. Any corrective action taken by module 220 can be communicated to the aftertreatment hardware controller such that engine performance related to emissions, and other engine parameters, can be maintained within predetermined operating ranges during transient and steady state operating conditions.

Figure 3:
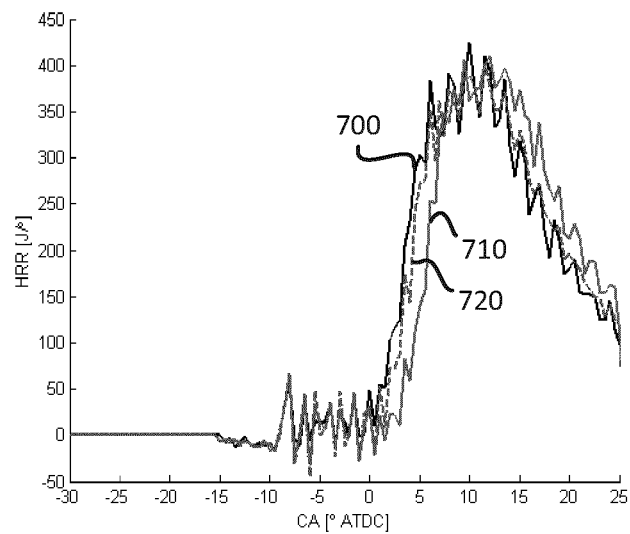
FIG. 3 is a plot of heat release versus crank angle for an engine running at 1200 RPM and 75% throttle showing a heat release curve for an original start of injection timing, a heat release curve for a shifted start of injection timing to simulate failure mode 3 in Table 1 (shift in injection timing) and a heat release curve for a corrected start of injection timing.
Figure 4:
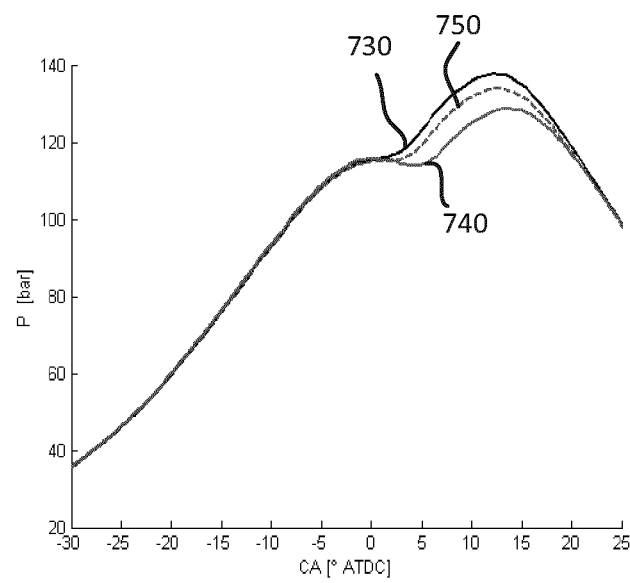
FIG. 4 is a plot of in-cylinder pressure versus crank angle for an engine running at 1200 RPM and 75% throttle showing a heat release curve for an original start of injection timing, a heat release curve for a shifted start of injection timing to simulate failure mode 3 in Table 1 (shift in injection timing) and a heat release curve for a corrected start of injection timing.

The ability of the diagnostic logic tree in module 220 to detect and mitigate issues resulting from the fuel system failure modes shown in Table 1 was tested and the results therefrom are illustrated in FIGS. 3 through 10. In a first phase module 220 was tested to detect and correct for failure mode 3 (unwanted shifts in injection timing). To simulate failure mode 3 the commanded injection timing for a selected cylinder was artificially modified by a small crank angle. The in-cylinder pressure for the selected cylinder was sensed by accelerometer 170 and the information passed on to controller 190 shown in FIG. 2. SOI timing correction 459 was generated in real time and employed in subsequent engine cycles. FIG. 3 shows heat release signal 700 for an original SOI timing, heat release signal 710 for a modified SOI timing and heat release signal 720 for a corrected SOI timing. FIG. 4 shows in-cylinder pressure signal 730 for an original SOI timing, in-cylinder pressure signal 740 for a modified SOI timing and in-cylinder pressure signal 750 for a corrected SOI timing. As these figures illustrate, SOC error 290 was reduced to within the predetermined range of tolerance.

Figure 5:
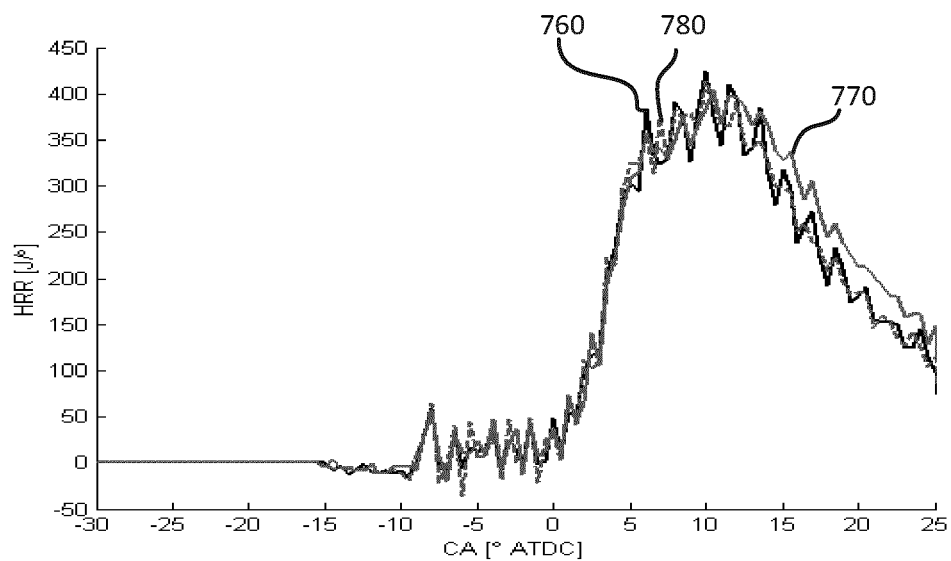
FIG. 5 is a plot of heat release versus crank angle for an engine running at 1200 RPM and 75% throttle showing a heat release curve for an original injection quantity, a heat release curve for a modified injection quantity to simulate failure modes 2 and 4 in Table 1 and a heat release curve for a corrected injection quantity.
Figure 6:
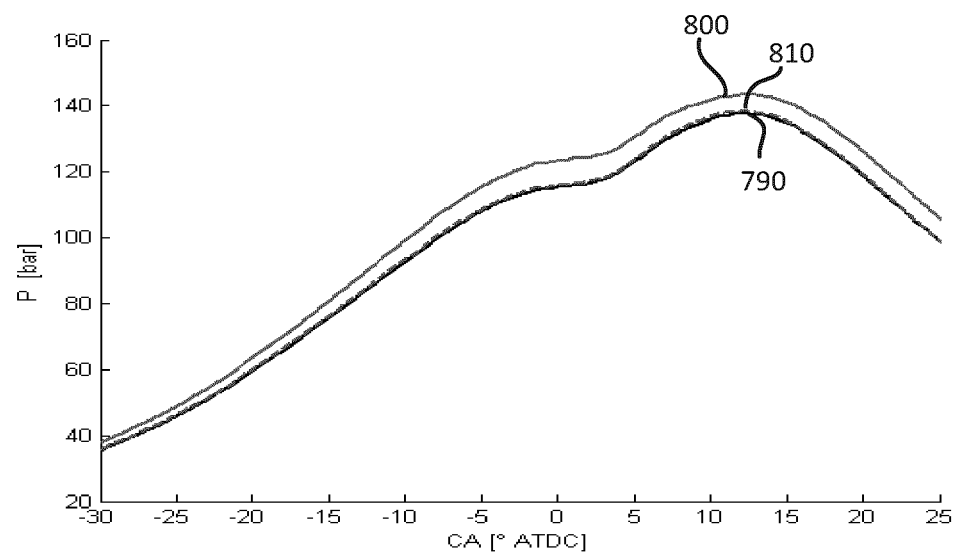
FIG. 6 is a plot of in-cylinder pressure versus crank angle for an engine running at 1200 RPM and 75% throttle showing a heat release curve for an original injection quantity, a heat release curve for a modified injection quantity to simulate failure modes 2 and 4 in Table 1 and a heat release curve for a corrected injection quantity.

In a second phase, module 220 was tested to detect and correct for unexpected changes in fuelling quantity, which can occur for either one of failure modes 2 and 4 in Table 1. To simulate failure modes 2 and 4, the commanded injection quantity for natural gas for a selected cylinder was artificially modified by roughly 10%. The change in injection quantity was immediately detected by module 220 and a real-time injection quantity correction was generated by controller 190. FIG. 5 shows heat release signal 760 for an original injection quantity, heat release signal 770 for a modified injection quantity and a heat release signal 780 for a corrected injection quantity. FIG. 6 shows in-cylinder pressure signal 790 for the original injection quantity, in-cylinder pressure signal 800 for the modified injection quantity and in-cylinder pressure signal 810 for the corrected injection quantity. As these figures illustrate, the fuelling quantity was adjusted such that the heat release and in-cylinder pressure were corrected to within predetermined ranges of tolerance.

Figure 7:
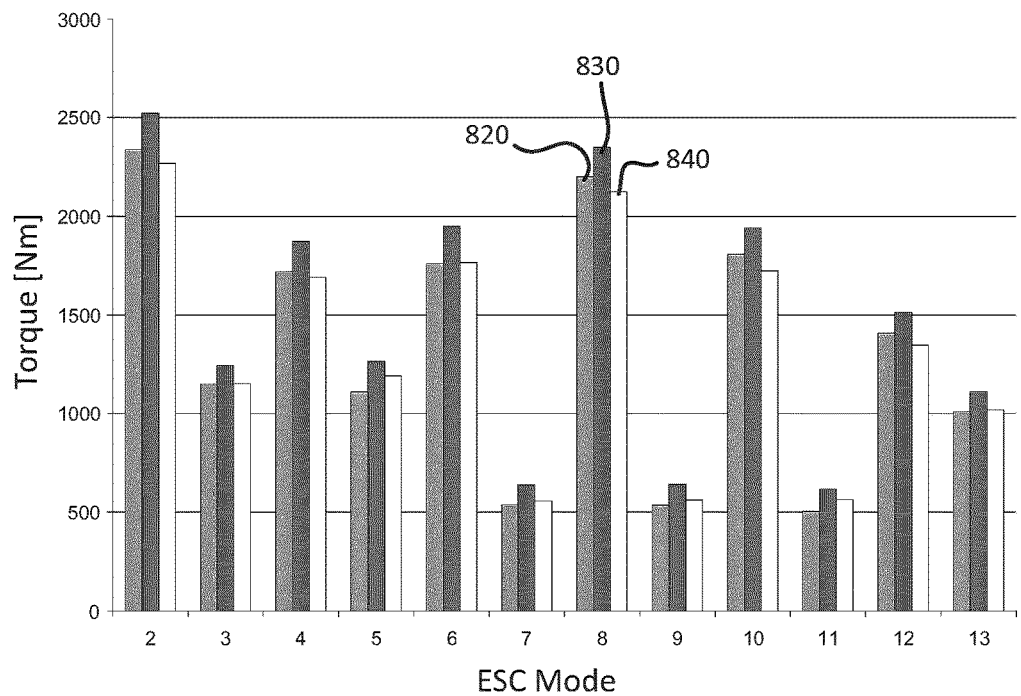
FIG. 7 is a bar graph of engine torque versus ESC mode for an engine running at 1200 RPM and 75% throttle showing torque for a typical line gas having a methane number of 87, torque for a mixed gas with a methane number of 65 and a corrected torque for the mixed gas after a fuelling correction.
Figure 8:
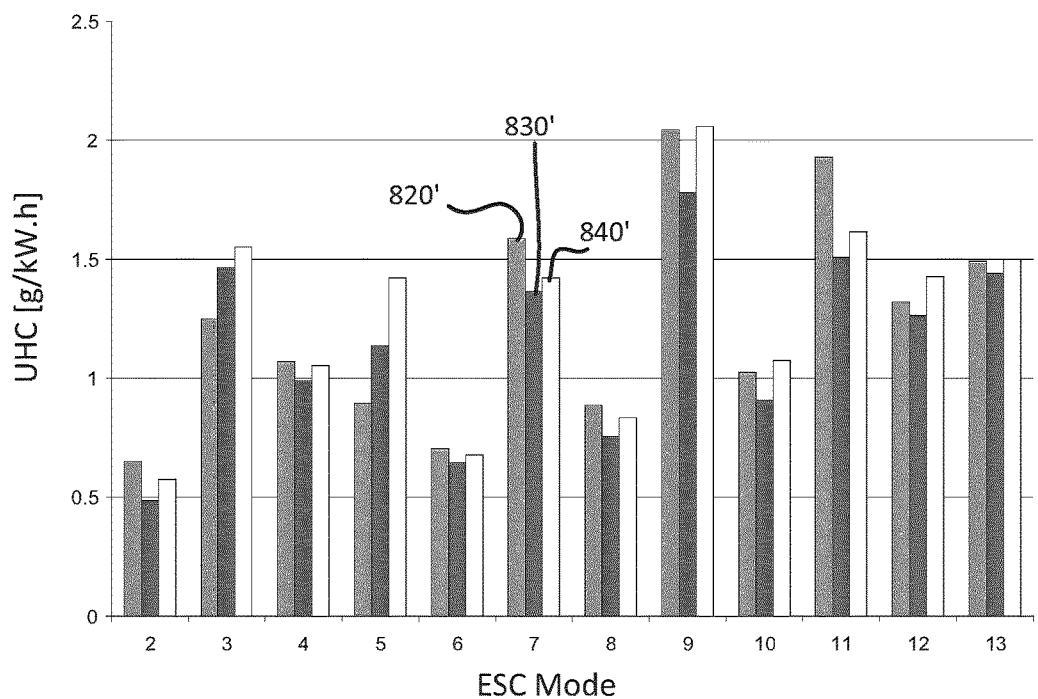
FIG. 8 is a bar graph of unburned hydrocarbon (UHC) emissions versus ESC mode for an engine running at 1200 RPM and 75% throttle showing UHC emissions when the engine is fuelled with a typical line gas having a methane number of 87, a mixed gas with a methane number of 65 and the mixed gas after a fuelling correction.
Figure 9:
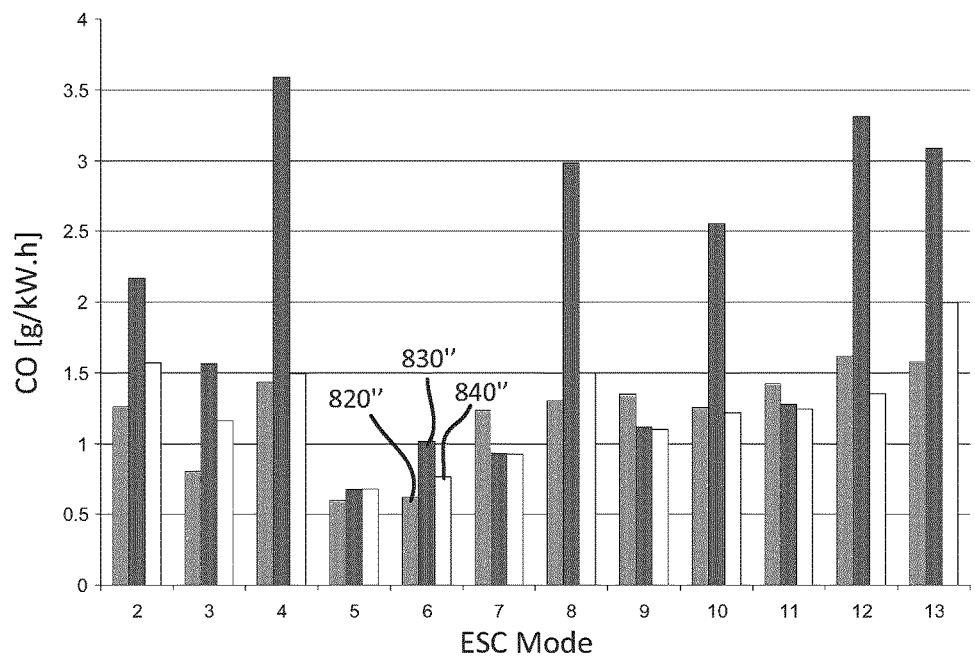
FIG. 9 is a bar graph of carbon monoxide (CO) emissions versus ESC mode for an engine running at 1200 RPM and 75% throttle showing CO emissions when the engine is fuelled with a typical line gas having a methane number of 87, a mixed gas with a methane number of 65 and the mixed gas after a fuelling correction.
Figure 10:
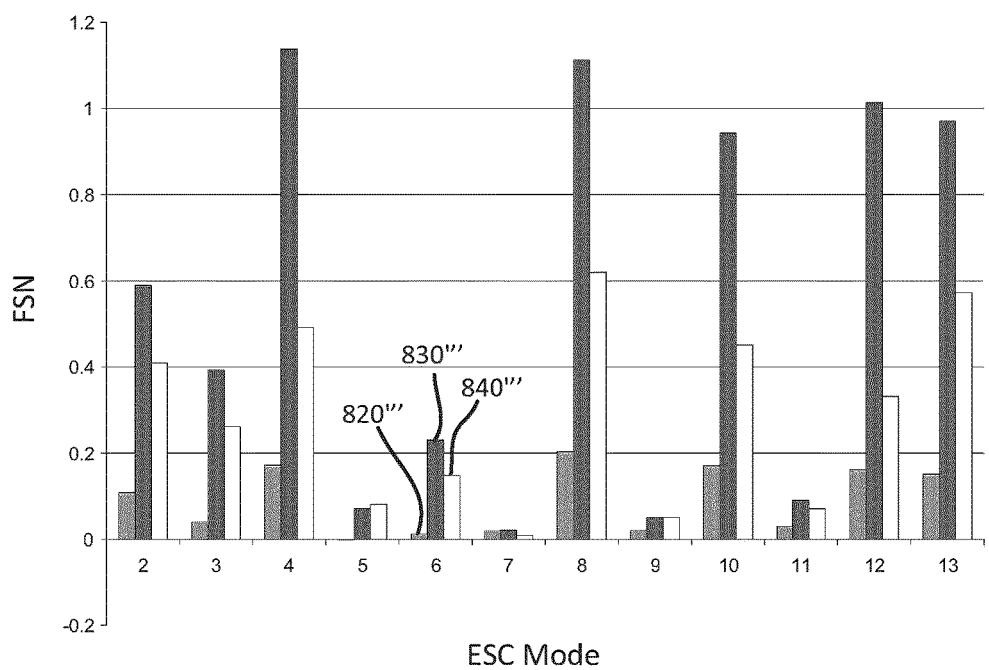
FIG. 10 is a bar graph of filter smoke number (FSN) versus ESC mode for an engine running at 1200 RPM and 75% throttle showing FSN when the engine is fuelled with a typical line gas having a methane number of 87, a mixed gas with a methane number of 65 and the mixed gas after a fuelling correction.

In a third phase, module 220 was tested to detect and mitigate changes in fuel quality (failure mode 5 in Table 1). To simulate a change in fuel quality, the engine was first operated with a typical line gas having a methane number of 87, and then with a mixed gas having a methane number of 65 comprising 9.6% propane, 4.4% ethane and 86% methane (by volume). The lower heating value (LHV) of the mixed gas is significantly higher than that of the typical line gas, and would over torque the engine at peak load if no fuelling correction was performed. In order for module 220 to perform fuelling correction, the engine was first run at a calibration point of 1200 RPM and 75% throttle to obtain heat release information when operated with the typical line gas which was recorded. The engine was then operated at the thirteen European Stationary Cycle (ESC) modes with the typical line gas, with the mixed gas without fuelling correction and with the mixed gas with correction. When the engine was operated with correction, correction map 630 generated fuelling correction 640 (SOI timing and fuelling quantity corrections). For each engine operation the torque and key emissions were monitored. In FIGS. 7 through 10, for each of the groupings of bars the first bar 820, 820', 820", 820'" represents the engine running with the typical line gas, the second bar 830, 830', 830", 830'" represents the engine running with the mixed line gas without correction and the third bar 840, 840', 840", 840'" represents the engine running with the mixed line gas with correction. The bars in FIG. 7 illustrate torque versus ESC mode. The bars in FIG. 8 illustrate unburned hydrocarbon (UHC) emissions versus ESC mode. The bars in FIG. 9 illustrate carbon monoxide emissions versus ESC mode. The bars in FIG. 10 illustrate filter smoke number (FSN) versus ESC mode. From these test results it can be seen that module 220 successfully compensated for the change in fuel quality and prevented over loading the engine and improved emission levels compared to the case without correction.

Module 220 can be employed with gaseous fuelled internal combustion engines to detect fuel quality changes in the fuel. A gaseous fuel is any fuel that is in a gaseous phase at standard temperature and pressure. One particular application for module 220 is during start-up of gaseous fuelled engines that are fuelled with a cryogenic fuel such as liquefied natural gas (LNG) or liquefied propane gas (LPG). A cryogenic fuel is any fuel that is in a gaseous phase at standard temperature and pressure. As is known by those familiar with the technology, cryogenic fuels are typically stored in a double-walled vessel that provides a vacuum insulation barrier to maintain the fuel near the boiling point. No matter how well the vessel is insulated, there is normally a small amount of heat leak into the vessel that causes the cryogenic fuel to boil. The gas vapor created from the boiling of the cryogenic fuel is called boil-off gas. Boiling of the cryogenic fuel raises the vapor pressure within the vessel. When the vapor pressure rises above a predetermined value a vent valve is opened to relieve the pressure. It is desirable to avoid venting the boil-off gas to atmosphere to reduce wasting fuel and greenhouse gas emissions. It is also desirable for the engine to consume the boil-off gas.

In one technique of operating the engine, the engine is fuelled with boil-off gas during start-up, and after the engine has been running for a predetermined amount of time or after vapor pressure within the cryogenic vessel drops below a predetermined value switches to fuelling with the cryogenic fuel. Consuming boil-off gas during engine start has several advantages. It reduces the likelihood of venting boil-off gas to atmosphere. It allows engine coolant temperature to increase for vaporizers that employ waste heat in the engine coolant to vaporizer the cryogenic fuel. It provides more time for cryogenic pumps to cool down to cryogenic temperatures before pumping cryogenic fuel for consumption by the engine. The fuelling maps employed by the engine controller (such as controller 190) are optimized for the typical quality of the cryogenic fuel found in the region where the engine operates (the default fuel quality). When the cryogenic fuel is comprised of a plurality of constituents, such as LNG, the boil-off gas has a different chemical composition than its cryogenic fuel source since the different constituents of the cryogenic fuel evaporate at different rates and temperatures. Due to the different chemical composition between boil-off gas and the cryogenic fuel, when the engine fuels from boil-off gas instead of the cryogenic fuel the combustion characteristics vary. Without fuelling correction emission levels can rise and torque levels can vary from desired targets.

One technique to solve these problems is for the engine controller to switch fuelling maps based on which fuel the engine is consuming. Normally, the engine controller determines whether the engine is fuelled with boil-off gas or with the cryogenic fuel by operating respective equipment associated with each fuelling path. There are a few shortcomings with this technique. First, the engine controller does not necessarily know the fuel composition of either the boil-off gas or the cryogenic fuel. The chemical composition of the boil-off gas varies over time as certain constituents within the cryogenic fuel evaporate at different rates. Since the composition of the boil-off gas varies, then clearly the composition of the cryogenic fuel, which is the source for the boil-off gas, varies as well. Module 220 can be employed to detect the fuel quality of whatever fuel is fuelling the engine and make appropriate fuelling corrections. The fuel source can be the cryogenic fuel, the boil-off gas or a combination of both the boil-off gas and the cryogenic fuel in varying proportion. The fuel quality of each of these fuel sources can vary over time.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:
1. A method for in situ operating an internal combustion engine comprising:

turbo-charging said internal combustion engine;
determining at least one combustion characteristic for each of a plurality of combustion chambers of said internal combustion engine, including an actual heat release signal for each of said plurality of combustion chambers;
inputting said actual heat release signal for each of said plurality of combustion chambers into a diagnostic logic tree for diagnosing changes in combustion characteristics due to at least one of:
 a fuel injector of a plurality of fuel injectors associated with said plurality of combustion chambers malfunctioning,
 a start of combustion timing error, and
 a change in a fuel heating value; and
performing a mitigation technique to compensate for said changes in combustion characteristics,
wherein said diagnosing includes:
 (i) determining whether or not each of said plurality of fuel injectors is injecting a desired amount of fuel into respective combustion chambers within a first range of tolerance; and
 (ii) determining whether or not a difference between an actual intake manifold pressure and a desired intake manifold pressure is outside a second range of tolerance,
wherein, in response to determining that each of said plurality of fuel injectors is injecting said desired amount of fuel into respective combustion chambers within said first range of tolerance and that said difference between said actual intake manifold pressure and said desired intake manifold pressure is outside said second range of tolerance, said mitigation technique includes determining a fuelling correction for said plurality of fuel injectors as a function of said difference between said actual intake manifold pressure and said desired intake manifold pressure.

2. The method of claim 1, further comprising:
determining a desired heat release signal as a function of engine operating conditions;
comparing a difference between said actual heat release signal and said desired heat release signal with a predetermined tolerance;
diagnosing said fuel injector of said plurality of fuel injectors is malfunctioning when said difference is outside a range of said predetermined tolerance; and
reporting said fuel injector is malfunctioning to an on-board diagnostic system.

3. The method of claim 1, further comprising:
determining a desired heat release signal as a function of engine operating conditions;
comparing a difference between said actual heat release signal and said desired heat release signal with a predetermined tolerance;
diagnosing said fuel injector of said plurality of fuel injectors is malfunctioning when said difference is outside a range of said predetermined tolerance;
diagnosing that said fuel injector of said plurality of fuel injectors is: (a) introducing too much fuel when said difference is greater than a positive value of said predetermined tolerance; and, (b) introducing too little fuel when said difference is less than a negative value of said predetermined tolerance; and
reporting said fuel injector of said plurality of fuel injectors is either introducing too much or too little fuel to an on-board diagnostic system.

4. The method of claim 1, further comprising:
determining another combustion characteristic for each of said plurality of combustion chambers, including an actual start of combustion timing; and
inputting said actual start of combustion timing for each of said plurality of combustion chambers into said diagnostic logic tree for diagnosing said start of combustion timing error.

5. The method of claim 4, further comprising:
determining a desired start of combustion timing as a function of engine operating conditions;
comparing a difference between said actual start of combustion timing and said desired start of combustion timing with a first predetermined tolerance; and
adjusting start of injection timing for at least one fuel injector of said plurality of fuel injectors to correct for said start of combustion timing error when said difference between said actual start of combustion timing and said desired start of combustion timing is outside a range of said first predetermined tolerance.

6. The method of claim 5, further comprising determining that said at least one fuel injector is introducing an amount of fuel within a range of a second predetermined tolerance as a precondition before adjusting said start of injection timing for said at least one fuel injector.

7. The method of claim 1, further comprising:
calculating, for each of said plurality of combustion chambers, a cumulative heat release based on said actual heat release signal;
calculating a mean cumulative heat release for said internal combustion engine based on said cumulative heat release for each of said plurality of combustion chambers,
wherein said diagnosing further includes:
 (iii) determining whether or not a difference between said mean cumulative heat release and a desired mean cumulative heat release for said internal combustion engine is outside a third range of tolerance,
wherein, in response to determining that each of said plurality of fuel injectors is injecting said desired amount of fuel into respective combustion chambers within said first range of tolerance and that said difference between said actual intake manifold pressure and said desired intake manifold pressure is outside said second range of tolerance, and determining said difference between said mean cumulative heat release and said desired mean cumulative heat release for said internal combustion engine is outside said third range of tolerance, said mitigation technique includes determining said fuelling correction as a function of said difference between said actual intake manifold pressure and said desired intake manifold pressure and said difference between said mean cumulative heat release and said desired mean cumulative heat release.

8. The method of claim 1, further comprising:
fuelling said internal combustion engine with boil-off gas during start-up;
detecting a change in fuel quality with respect to a default fuel quality when fuelling with boil-off gas; and
switching to fuelling with a cryogenic fuel after determining one of: (a) a predetermined amount of time fuelling said internal combustion engine with said boil-off gas has elapsed or (b) vapor pressure for said boil-off gas has dropped below a predetermined value.

9. The method of claim 1, further comprising
fuelling said internal combustion engine with one of a cryogenic fuel, a boil-off gas of said cryogenic fuel, or a combination of said cryogenic fuel and said boil-off gas of varying proportions; and detecting a change in fuel quality with respect to a default fuel quality.

10. The method of claim 9, further comprising:

selectively fuelling said internal combustion engine with said cryogenic fuel, said boil-off gas, or said combination of said cryogenic fuel and said boil-off gas according to at least one of:

fuelling said internal combustion engine with said boil-off gas during engine start-up;

fuelling said internal combustion engine with cryogenic fuel after a predetermined amount of time after engine start-up;

fuelling said internal combustion engine with cryogenic fuel after boil-off gas pressure decreases below a predetermined lower pressure threshold; or fuelling with said combination of said cryogenic fuel and said boil-off gas during normal engine operation when boil-off gas pressure increases beyond a predetermined upper pressure threshold.

11. An apparatus for in situ operating an internal combustion engine comprising:

one or more accelerometer sensors associated with a plurality of combustion chambers in said internal combustion engine; and a controller which, in operation:

receives a signal from each of said accelerometer sensors representative of pressure in a respective combustion chamber;

determines at least one combustion characteristic for each of said plurality of combustion chambers including an actual heat release signal for each of said plurality of combustion chambers;

inputs said actual heat release signal for each of said plurality of combustion chambers into a diagnostic logic tree for diagnosing changes in combustion characteristics due to at least one of:

a fuel injector of a plurality of fuel injectors associated with said plurality of combustion chambers malfunctioning, a start of combustion timing error, and a change in a fuel heating value; and performs a mitigation technique to compensate for said changes in combustion characteristics, wherein said internal combustion engine is turbo charged, wherein said diagnosing includes said controller, in operation:

(i) determines whether or not each of said plurality of fuel injectors is injecting a desired amount of fuel into respective combustion chambers within a first range of tolerance; and (ii) determines whether or not a difference between an actual intake manifold pressure and a desired intake manifold pressure is outside a second range of tolerance, wherein, in response to said controller determining that each of said plurality of fuel injectors is injecting said desired amount of fuel into respective combustion chambers within said first range of tolerance and that said difference between said actual intake manifold pressure and said desired intake manifold pressure is outside said second range of tolerance, said mitigation technique includes said controller, in operation, determines a fuelling correction for said plurality of fuel injectors as a function of said difference between said actual intake manifold pressure and said desired intake manifold pressure.

12. The apparatus of claim 11, wherein said controller, in operation:

determines a desired heat release signal as a function of engine operating conditions;

compares a difference between said actual heat release signal and said desired heat release signal with a predetermined tolerance;

diagnoses said fuel injector of said plurality of fuel injectors is malfunctioning when said difference is outside a range of said predetermined tolerance: and reports said fuel injector is malfunctioning to an on-board diagnostic system.

13. The apparatus of claim 11, wherein said controller, in operation:

determines a desired heat release signal as a function of engine operating conditions;

compares a difference between said actual heat release signal and said desired heat release signal with a predetermined tolerance;

diagnoses said fuel injector of said plurality of fuel injectors is malfunctioning when said difference is outside a range of said predetermined tolerance;

determines that said fuel injector of said plurality of fuel injectors is malfunctioning by one of (a) introducing too much fuel when said difference is greater than a positive value of said predetermined tolerance or (b) introducing too little fuel when said difference is less than a negative value of said predetermined tolerance; and reports said fuel injector of said plurality of fuel injectors is either introducing too much or too little fuel to an on-board diagnostic system.

14. The apparatus of claim 11, wherein said controller, in operation:

determines another combustion characteristic for each of said plurality of combustion chambers, including an actual start of combustion timing; and inputs said actual start of combustion timing for each of said plurality of combustion chambers into said diagnostic logic tree for determining said start of combustion timing error.

15. The apparatus of claim 14, wherein said controller, in operation:

determines a desired start of combustion timing as a function of engine operating conditions;

compares a difference between said actual start of combustion timing and said desired start of combustion timing with a first predetermined tolerance; and corrects for said start of combustion timing error by adjusting start of injection timing for at least one fuel injector of said plurality of fuel injectors when said difference between said actual start of combustion timing and said desired start of combustion timing is outside a range of said first predetermined tolerance.

16. The apparatus of claim 15, wherein said controller, in operation, determines that said at least one fuel injector is introducing an amount of fuel within a range of a second predetermined tolerance as a precondition before adjusting said start of injection timing for said at least one fuel injector.

17. The apparatus of claim 11 wherein said controller, in operation:
- calculates, for each of said plurality of combustion chambers, a cumulative heat release based on said actual heat release signal;
- calculates a mean cumulative heat release for said internal combustion engine based on said cumulative heat release for each of said plurality of combustion chambers, wherein said diagnosing further includes said controller, in operation:
- (iii) determines whether or not a difference between said mean cumulative heat release and a desired mean cumulative heat release for said internal combustion engine is outside a third range of tolerance, wherein, in response to said controller determining that each of said plurality of fuel injectors is injecting said desired amount of fuel into respective combustion chambers within said first range of tolerance and that said difference between said actual intake manifold pressure and said desired intake manifold pressure is outside said second range of tolerance, and determining said difference between said mean cumulative heat release and said desired mean cumulative heat release for said internal combustion engine is outside said third range of tolerance said mitigation technique includes said controller, in operation, determines said fuelling correction as a function of said difference between said actual intake manifold pressure and said desired intake manifold pressure and said difference between said mean cumulative heat release and said desired mean cumulative heat release.

18. The apparatus of claim 11, wherein said controller, in operation:
- detects a change in fuel quality with respect to a default fuel quality when fuelling with a boil-off gas; and
- causes a switch to fuelling with a cryogenic fuel after determining one of:
  - a predetermined amount of time fuelling said internal combustion engine with said boil-off gas has elapsed; or
  - vapor pressure for said boil-off gas has dropped below a predetermined value.

19. The method of claim 1 wherein, the difference between said actual intake manifold pressure and said desired intake manifold pressure results from a change in exhaust pressure due to said change in said fuel heating value.

20. The apparatus of claim 11 wherein, the difference between said actual intake manifold pressure and said desired intake manifold pressure results from a change in exhaust pressure due to said change in said fuel heating value.

* * * * *